United States Patent [19]

Hemker

[11] Patent Number: 4,849,233

[45] Date of Patent: Jul. 18, 1989

[54] MELTABLE COATING AND BINDER COMPOSITION FOR POPPED CORN KERNELS

[76] Inventor: Leonard E. Hemker, 459 N. Leonard St., West Salem, Wis. 54669

[21] Appl. No.: 119,695

[22] Filed: Nov. 12, 1987

[51] Int. Cl.$^4$ .................. A23G 3/32; A23L 1/025
[52] U.S. Cl. .................. 426/93; 426/107; 426/273; 426/274; 426/291; 426/293; 426/297; 426/629
[58] Field of Search .............. 426/93, 274, 107, 288, 426/291, 293, 297, 629

[56] References Cited

U.S. PATENT DOCUMENTS

| | | | |
|---|---|---|---|
| 1,382,601 | 6/1921 | Cressey | 426/660 |
| 2,958,602 | 11/1960 | Gilmore | 99/80 |
| 3,323,922 | 6/1967 | Durst | 99/166 |
| 3,431,112 | 3/1969 | Durst | 99/1 |
| 3,434,843 | 3/1969 | Durst | 99/1 |
| 3,615,597 | 10/1971 | Durst et al. | 99/140 R |
| 3,620,769 | 11/1971 | Peterson | 99/134 |
| 3,682,659 | 8/1972 | Jurezak | 99/134 A |
| 3,950,567 | 4/1976 | Tomlinson | 426/625 |
| 4,416,906 | 11/1983 | Watkins | 426/107 |
| 4,529,607 | 7/1985 | Lenchin et al. | 426/94 |
| 4,553,010 | 11/1985 | Bohrer et al. | 426/107 |
| 4,751,090 | 6/1988 | Belleson et al. | 426/93 |

FOREIGN PATENT DOCUMENTS

| | | |
|---|---|---|
| 52-37062 | 9/1977 | Japan . |
| 2152351 | 8/1985 | United Kingdom . |

*Primary Examiner*—Donald E. Czaja
*Assistant Examiner*—Helen Pratt
*Attorney, Agent, or Firm*—M. Paul Hendrickson

[57] ABSTRACT

Coated and shaped popped popcorn products may be prepared from a coating and a binding composition possessing a thermoplastic melt temperature substantially lower than preparatory melt and thermoset properties of conventional popped popcorn coating and binder compositions. Popped corn kernels coated and bound together with the coating compositions possess exceptional physical and chemical attributes under divergent environmental conditions. The edible coating compositions are formulated at a high sweeteners solids level along with a hydrophillic film former (e.g. gelatin, egg albumin, etc.) and a high fat component content level. The coating and binder systems possess remelt properties, and the products may be cooked in a microwave oven.

19 Claims, No Drawings

MELTABLE COATING AND BINDER COMPOSITION FOR POPPED CORN KERNELS

SUMMARY OF THE INVENTION

The present invention pertains to popped popcorn products and more particularly, to popped corn kernels coated with an edible binder, preformed products prepared therefrom wherein the popped popcorn kernels are bound together by a binder system which permits the product to retain its freshness and structural integrity when frozen and then subjected to microwave cookery and the method for preparing the same.

BACKGROUND OF THE INVENTION

The recipe for preparing preformed popped popcorn products, such as popcorn balls, has changed little since its inception. A conventional popcorn ball recipe generally entails separately preparing a freshly popped popcorn batch and a relatively high solids, a molten sugar syrup binder system containing the desired flavoring and coloring additives, mixing the popped corn and molten syrup binder together to coat the surfaces of the individual popped corn kernels with the syrup binder, molding the binder coated popped corn kernels into the shape of a popcorn ball by compressing the coated kernels within a popcorn forming molding device.

The popcorn balls manufacture is pragmatically limited to small batch production, especially since conventional syrup binders tend to readily crystalize within a relatively narrow cooling temperature range. Thus, when a conventional, high-solids sugar syrup binder systems cools a few degrees, the sugar tends to prematurely solidify and crystalize which destroys its binder efficacy in the preparation of such preformed products. The physical and compositional differences between the high-solids binder and coated kernels are not suitably adapted for reconstituting the sugar into solution by reheating of the coated popcorn kernels. Consequently, popcorn kernels coated with a solidified syrup are generally considered unfit for further use in the molding of popcorn balls therefrom.

Popcorn balls formulated from high-solid sugar binder systems also inherently fail to provide the necessary prerequisitial properties as currently demanded by modern day manufacture, distribution and consumer practices. The consumer desired to purchase a preformed popped popcorn product which possesses the freshness and textural eating qualities of a freshly prepared product. Preformed popcorn products formulated with conventional high solid sugar binder systems inherently lack the physical and compositional characterisitcs to adequately protect the product against deterioration, especially when subjected to the divergent environmental storage conditions as typically encountered within its trade. Popcorn balls formulated with a conventional binder are known to possess poor aging and shelf stability, even when stored under controlled environmental conditions such as typically provided by conventional heating and air conditioning units. These poor aging and shelf stability characteristics appear to be due to inherent deficiencies of the binder system. Upon aging, the sugar solids of the binder convert to a very hard and unchewable crystalline structure. Within a month or less, the aged popcorn balls are typically discarded by the retailer and replaced with a fresh product batch. The conventional binder systems also possess a relatively high degree of hygroscopicity, consequently environmental exposure to hot and humid conditions such as normally experienced during the summer months or southern climates can result in moisture absorption and liquification of the binder system. Conversely, exposure to less humid environmental conditions tend to crystalize and harden the binder sugar components and render the product unfit for consumption.

It would be of advantage to manufacturers and distributors to be able to mass produce the product at a central location, warehouse and later ship the product to regional and local distributors so as to meet the consuming public requirements as they arise. Meeting these modern day consumer demands, the shelf-life and retention of the desired freshly prepared product attributes has become an increasingly desirable goal which heretofore cannot be achieved under conventional preformed product manufacturing and binder system practices.

Conventional binder systems for preformed popped popcorn products are also poorly suited for application to modern day manufacturing, distribution and consumer culinary practices. Within recent years, microwave cooking has been increasingly used by the ultimate consumer in the preparation of foods and snack products. Another common practice within the food industry, is to extend product shelf-life by refrigeration or by freezing food products. The frozen or refrigerated food products technology has increasingly expanded into specialty products adapted for use in microwave cookery. Unfortunately, conventional preformed popcorn products are not suited for this purpose. Microwave cooking affects and alters the available and bound moisture content of the food product. Preformed popped popcorn products formulated with conventional high sugar solid binders primarily rely upon its bound moisture content to serve as a plasticizing agent. The microwave cooking of such conventional products tends to evaporate moisture from the binder and convert the product into an extremely hard and unchewable product form. Thus for reasons mentioned above and other associated factors, preformed popped corn products formulated with conventional high syrup solid binder systems have inherently failed to provide the necessary prerequisitial properties as currently desired by the food industry.

A more efficient means in the manufacture of a preformed popped popcorn product formulated with a binder system that preserves and protects the desired freshness, taste, textural and eating qualities of a freshly prepared product would represent a significant technological advance to the art. It would further benefit the trade and consuming public if there could be provided a preformed popcorn product which could be more readily adapted to the more current manufacture, distribution and consumer practices commonly associated with other modern day food products. A preformed popped popcorn formulated with a binder system to overcome the wastes normally attendant conventional binders would afford substantial mass manufacturing improvements and benefits. The preformed popped popcorn product market could also expand into different trading channels if it were possible to provide a product which would lend itself to enhanced storage life and compatibility with the existing frozen and refrigeration trade practices. A binder system which would protect the overall eating, physical and compositional characteristics of the product while also being suited for microwave cooking without causing deterioration of the binder or product would likewise represent a substantial technological advance over current practices. Recognizing the aforementioned problems associated with the current preformed popped popcorn products, its manufacture and applications, the present invention affords a means for overcoming these inherent defects by providing a unique popped corn coating composition and preformed popcorn products formulated with a superior binder system, as well as a uniquely different means for the manufacture and use thereof.

DETAILED DESCRIPTION OF THE INVENTION

Pursuant to the present invention, there is provided a popped corn kernel product generally comprised of a multiplicity of popped corn kernels and a meltable coating composition externally coated upon the surface of said popped corn kernels with said meltable coating composition comprising sweetener solids as the major dry solids ingredient of said coating composition on a weight basis, at least two parts edible fat component for each 10 parts by weight dry sweetener solids and at least one part by dry weight edible hydrophillic film former solids for each 200 parts by weight dry sweetener solids uniformly blended together so as to provide a coating composition characterized as having a melting point within a temperature range of about 50° C. to about 95° C.

The popped corn kernels coated with the meltable coating composition serves as a suitable substrate for the manufacture of preformed or shaped popped corn products. Such preformed popped corn products are generally characterized as comprising a multiplicity of popped popcorn kernels and an edible binder consisting essentially of said meltable coating composition which binds the kernels together in the form of a shaped or molded popcorn product. Such preformed products may be viewed as comprising an internal phase of discrete popped popcorn kernels bound together in the form of a preformed popped corn product by a substantially continuous external phase of the edible binder. The edible binder or meltable coating composition enhances the products freshness, quality, and storage stability while also providing a protective encapsulating coating and binder system for holding together the individual kernels into the desired shaped or molded product.

The internal phase of the preformed corn products typically comprises popped corn kernels, as the major internal phase component (on a weight basis) and may be formulated with or without other internal phase additives. Popped corn kernels may be prepared by popping kernels in an enclosed cooking vessel containing a frying oil or fat (e.g. butter, animal or vegetable shortening, popcorn cooking oils, etc.) to facilitate popping and prevent popped corn charring along with salt and other flavoring and coloring recipe additives that may be optionally added in an amount sufficient to impart the desired flavor and/or color to the popped corn kernel products. When frying oils or fats are used to pop the kernels, a substantial amount of the frying fat or oil will usually absorbed into the porous intercies of the popped kernels along with any optionally added flavoring and coloring additives. Corn kernels may also be popped by cooking in heated air blown devices without necessitating any edible fat component, flavoring, coloring or other recipe additives for its preparation. After popping, the preparer often blends the popped kernels with salt, butter or imitation butter flavored fat or oil replacements and any of other flavoring and coloring additives, as may be desired by the preparer.

In general, the popped kernels will generally constitute (on a dry weight basis) the major internal phase component of the preformed popped corn products herein. The internal phase may consist of popped corn kernels in a substantially pure form without necessitating any further internal phase recipe additives. The dry weight ratio popped kernels to the remainder of other internal phase additives (i.e. other than the popped corn kernels per se) will typically range from at least 2:1 and most frequently at a weight ratio of about 3:2 or higher.

When additives other than popped corn kernels are used as part of the internal phase recipe, the edible fats will typically comprise the second most predominant ingredient or the major minor additive (on a dry weight basis) of the internal phase recipe. The level of edible fat component can vary considerably and thus may be optionally included in an amount ranging from one (or less) to about 8 parts by weight edible fat component or more for each 10 parts by dry weight popped kernels. Edible fats or oils, however, serve as an excellent carrier for uniformally dispersing volatile and non-volatile flavoring and coloring additives (if desired) throughout the internal phase. Thus, in the more limited embodiments of the invention, an edible fat or oil will be additionally included, as an internal phase component, at a level of at least one part and preferably at least four parts by weight edible fat component for each 10 parts by weight dry popped corn kernels.

The meltable coating composition and concomitant binder system of this invention is formulated with sweetener solids, an edible fat component and an edible hydrophillic film former. A typical of binders converntionally used in preparing preformed popcorn products, the coating composition and binder system used in this invention, are formulated with substantial amounts of edible fat and hydrophillic film former in addition to the sweetener solids. The combination of sweetener solids, edible fat and hydrophillic film former contribute towards a multiplicity of functional advantages within the meltable coating or binder systems of this invention.

Conventional sweeteners constitute the major dry solids component (total weight basis) of the external phase. Such sweeteners are commonly used in the aerated confectionary art and will normally contain saccharides of a D.P. (degree of polymerization) of less than three (e.g. the mono and dissaccharides) as the major molar dry solids component of the sweetener. Dextrose, fructose, lactose, maltose and sucrose are representative of the more commonly used food grade mono and disaccharides sweeteners. Exemplary sweetener sources include cane or beet sugars (sucrose) as well as the nutritive corn sweeteners such as the high fructose corn syrups, corn syrups (e.g. dextrose equivalents, D.E. 20-98, and particularly those of D.E. greater than 58 and preferrably more than a D.E. of 73) mixtures thereof and the like. The sweeteners may be in solid or liquid form with the former generally necessitating a sufficient amount of water or water precusor to permit the water-soluble external phase additives (e.g. sweetener and hydrophillic film) to dissolve into solution, at the temperatures used herein to prepare the molten external phase components. The molten external phase should be in form so it will adhesively adhere and bind the individual popped corn kernels and permit its molding into its desired form. An excessive water content will tend to reduce tackifying and binding capabilities of the binder system. Excessive water levels, however, may be appropriately adjusted to the proper adhesvie tack by evaporating moisture from the dissolved hydrophillic film former and sweetener solids prior to its use as a binder. As mentioned herein, marshmallows afford an excellent source material for both the hydrophillic film former and sweetener components of the external phase. Marshmallows also typically contain an appropriate water content to permit both the sweetener and former to dissolve while also affording a molten coating or binder system possessing an appropriate tackifying and binding properties for coating and shaping the popped corn products of this invention.

The hydrophillic film former normally constitutes the least predominant ingredient of the sweetener solids, edible fat and film former combination. It, however, significantly contributes towards the overall efficacy of the meltable coating compositions, and binder systems herein. Film formers which are generally adaptable herein have the functional capacity when uniformally blended under aerating blending conditions with a high concentration of sweetener solids and water to form foamed or aerated food product. These hydrophillic film formers are conventionally used in the preparation of aerated high-sugar solid confectionaries such as whipped toppings, soft creme candy centers, meringues, mousse, marshmallow, and the like, food products. Within the food trade, such film former are often referred to as whipping components or agents and are specifically adapted and for use in the manufacture of aerated food products which contain sweetener solids as the major dry solids recipe ingredient.

Edible hydrophillic film formers heretofore suggested for such aerated recipes include food grade extracts of an animal origin such as the modified and unmodified proteinaceous materials including the animal albumins etc., extracts of a vegetable origin such as the modified and unmodified grain albumins, fruit, bacterial and vegetative extracts, fractionated carbohydrate whipping agents, synthetic polymeric film forming substrates, mixtures thereof and the like. Such film formers generally have a capacity in conjunction water, sweetener solids (with or without edible surface active or foaming additives) to ingest air and form aerated food products generally comprised of a continuous external phase of water, film former and sweetener solids and a discontinuous internal phase of a multiplicity of minute gases encapsulatively entrapped within the continuous external phase. Egg albumin, cereal grain albumins (e.g. corn germ, bran, soy, pea bean, etc. albumins), gelatin, sodium caseinate, nonfat milk solids, the modified food grade whipping starches, carboxymethyl cellulose, sodium carboxymethyl cellulose, agar, fish protein isolates, whey proteins, maltrodextrins and dextrins (generally as co-whipping agent additives), polyvinyl alcohol, polyvinylpyrrolidine, calcium alginate, potassium alginate, sodium alginate, carrageenan and salts thereof, hydroxypropyl cellulose, methyl cellulose, methyl ethyl cellulose, pectin, gum acacia, locust bean gum, gum ghatti, guar gum, gum karaya, oat gum, gum tragacanth, etc., mixtures thereof and the like are illustrative film formers heretofore used alone or in conjunction with ancillary film formers as whipping components.

The edible film formers which are used as a whipping agent in the manufacture of marshmallows such as gelatin and egg albumin are particularly well suited for use as the edible hydrophillic film forming component herein. The aerated marshmallow structure coupled with its high sweetener solids level, hydrophillic film former and bound water content facilitates the incorporation of an edible fat and into the coating compositions and binder systems of this invention. Marshmallows (normally solid at ambient temperatures, and customarily distributed in flexible packages) are particularly useful for this purpose. Marshmallows customarily contain (an a solid weight basis) a high level of sweetener solids (e.g. sucrose, dextrose and/or corn syrup sweetener solids typically formulated at about 80 to about 98 per cent of the total dry recipe solids weight) and an edible hydrophillic film former (e.g. gelatin, albumin, agar) at about 0.5 to about 15 per cent of the dry solids content and, in addition to the solids content thereof, from about 10 to about 30 percent (most typically at about 15 to about 25 percent) bound water. Artificial flavoring and coloring, preservatives, corn starch, humectants, etc. (e.g. see U.S. Pat. No. 3,620,769 by M. Peterson) may be included within the marshmallow recipe. Upon heating, the marshmallow water content in combination with the edible fat component are generally sufficient to permit the sugar solids and hydrophillic film formers to redissolve at a relatively low melt temperature and form a thick and tacky molten mass.

The most appropriate film former level will depend upon its film forming efficacy. The hydrophillic film forming component will usually comprise less then 15% by weight of the total external phase dry solids weight. For most recipes herein, the hydrophillic film former will generally fall within the range of about 0.5 to about 10 parts by weight film former dry solids for each 100 parts by weight dry sweetener solids with an amount ranging from about 1 to about 8 (most typically from about 2 to about 5) parts by weight film former for each 100 parts by weight sweetener solids. The hydrophillic film former reduces the melting point of the sweetener solids component so as to enable coating and binding at significantly lower temperatures.

The coating and binder systems of this invention further depart from conventional coating and binder recipes by its inclusion of a substantial amounts of the edible fat component. The edible binder or meltable coating composition formulation may be relied upon as the exclusive edible fat component source for the products herein. If desired, other optional phase additives may also be included, such as those deemed desirable to enhance its textural eating qualities, stability, flavor, color, etc. overall product and processing attributes. A variety of edible fat components, either in the solid or liquid form at 20° C., may be used for this purpose. The term "edible fat component" herein is intended to include lipids (solid or liquid form at 20° C.) which generally comprise the esters of higher fatty acids and a trihydric alcohol. Accordingly, such edible fat components include the fatty acid (e.g. $C_{12}$–$C_{22}$) esters of trihydric alcohol such as the mono-, di- and tri-glycerides and mixtures thereof. Suitable edible fats include those of an animal and vegetable origin. Illustrative edible fats include edible fats normally solid at 20° C. (e.g. butter, cocoa butter, lard, hydrogenated vegetable oils or margarines, etc.) and edible fatty oils (normally liquid at 20° C.) such as the unhydrogenated vegetable oils of cotton seed, corn, coconut, peanut, palm, sunflower, safflower, soybean oils, etc., mixtures thereof and the like. The edible fat component advantageously is at least one fat selected from the group consisting of sunflower oil, the hydrogenated vegetable oils (particularly margarines of a low unsaturated fat content such as the hydrogenated corn and sunflower oils) and butter.

Similar to the hydrophillic former, the edible fats significantly contribute in reducing the external phase melting point, which affords a broader working temperature range and working time to coat the kernels and mold the coated kernels into the desired product. The edible fats in conjunction with the film former and sweetener solids provide a lubricating effect upon the coating and binder systems, which in turn, enhances its handling and workability. Contrary to expectations, the uniform blended admixture of fat, film former and sweetener solids provides a substrate within which the combined external phase components (including the fat component) retain their desired compositional, structural, textural, taste and eating qualities, even when stored over prolonged periods of time. Unstable edible fats (normally susceptible to deterioration under ambient storage conditions such as butter) retain their original freshness and eating qualities notwithstanding storage under conditions conducive to substantial deterioration or decomposition of the fat component. The compositional and structural integrity of the external phase appears to provide a protective substrate for preserving the edible fat component quality.

The combined effect of the fat, film former and edible fat also contributes towards the binder's resistance against bound moisture alteration. Unlike conventional binders which tend to become extremely hard and unchewable when exposed to arid or dry cooking conditions (e.g. microwave cooking), the external phase of this invention remain relatively unaffected by such conditions. Although the binder exhibits melt and flow characteristics when heated under dry cooking conditions (such as occurs in microwave cooking), the coating and binder compositions herein (upon microwave cooking to melt) will generally return to its innate textural and eating qualities upon cooling to a temperature below its melting point. In contrast, conventional binder systems upon microwave cooking convert into a highly dense, hard crystalline structure (apparently due to moisture evaporation and crystallization) which structure is retained when the product is cooled to an ambient temperature. Conventional coating and binder systems are also prone to an extremely hard and unchewable structure upon storage under relatively dry and ambient conditions within a month or less. In contrast, the coating and binder systems herein substantially retain a desirable innate eating and masticating qualities, notwithstanding storage under arid conditions for considerably longer (e.g. six months) periods. Conventional binder systems also characteristically tend to absorb moisture when stored under humid conditions. The binder systems of this invention, however, characteristically possess a low level of hygroscopicity and may be stored under hot and humid conditions for considerably longer time periods than the conventional binder systems. The edible fat and film former coating additives are considered to exert a major stabilizing effect upon the inherent deficiencies of edible coating and binder systems formulated with a high sugar solids content.

In a more limited embodiment of the present invention, there is also provided a method for preparing a shaped popcorn product comprised of a multiplicity of popped corn kernels bound together with an edible binder admixture which possesses sufficient melt properties so as to permit the product to substantially retain its textural and structural integrity when frozen and thereafter subjected to microwave cooking, said method comprising:

(a) providing an edible molten binder admixture mass comprised of 100 parts by weight of sweetener solids as a major component on a dry weight basis of said binder admixture, at least 0.5 parts by weight hydrophillic film former, at least 2.0 parts by weight edible fat component by admixing together at a temperature sufficient to convert said sweetener solids, film former and fat into a molten and adhesive binder admixture mass;

(b) uniformly blending together said molten binder mass with a popped corn composition comprised of a multiplicity of popped corn kernels as a major weight component of said composition under blending conditions sufficient to coat substantially all of said popped corn kernels with said molten binder mass and thereby provide a uniform blend thereof, and;

(c) shaping said uniform blend into the form of a shaped popcorn product by applying sufficient compressive pressure onto the uniform blend so as to form said blend into a shaped popcorn product comprised of a multiplicity of popped corn kernels bound together with said edible binder admixture.

In a more refined embodiment of the invention, the molten binder admixture mass is prepared by admixing the sweetener and edible hydrophillic film former solids together with an edible fat component under admixing conditions at a molten temperature sufficient to uniformly blend the fat throughout the molten mass. The film former and sweetener solids may be separately derived from suitable raw ingredients. However as mentioned above, marshmallow solids serve as a particularly excellent film former and sweetener solids recipe source material.

Conventional binders of a high sweetener solids level generally require temperatures of 115° C. or higher to convert the binder solids into a molten form. The binder formulation herein possess a substantially lower melting temperature (e.g. less than 100° C.) to provide definitive processing and end product advantages. The reduced melt temperatures substantially diminish the thermal degradative and decompositional effects upon the basic coating and binder formulation ingredients as well as the optional ingredient additives (e.g. flavoring and coloring additives) thereof. The reduced melt temperatures facilitate the ease whereby the preparer may maintain an appropriate bound water level within the coating and binder systems. Excessive evaporative moisture losses inherently attendant to conventional high-sugar solids are avoided by melt temperatures well below the boiling point of water. Bound water within the edible coating and binder systems effectively serves as a plasticing reagent to preserve the desirable shelf-stability, moistness, textural, taste, chewability and masticatability attributes of the product. Retention of the bound water content also functions as a coating and binder co-component which permits the popped corn products to be frozen, thawed and subsequently cooked in a microwave oven.

The most appropriate temperature for converting the coating and binders into a molten mass will depend largely upon the particular ingredients and recipe proportions. The binder combination of this invention affords a lower and broader temperature range for converting and maintaining the binder in a molten mass state. The hydrophillic film former in combination with the other coating and binder ingredients will enable the processor, if desired, to also operate at temperatures above the boiling point of water. Melting temperatures of less than 100° C. and especially at less than 90° C. can be used to substantial advantage in preparing the molten binder masses herein. For most applications converting the ingredients into a molten mass may be appropriately conducted at processing temperature ranging from about 50° C. to about 96° C. and most typically at a temperature ranging from about 60° C. to about 90° C. The edible fat component may also influence the susceptability of the molten mass to browning. Certain of the edible fat components which are normally fluid at room temperature (e.g. sunflower oil) tend to stabilize mass against browning at the more elevated temperatures (e.g. at 80° C. or higher). In a more limited aspect of the invention, the conversion of the fat and binder solids to a molten binder admixture is conducted within about a 65° C. to about 85° C. and preferably at a melt temperature less than 80° C.

Thermal degradation avoidance, preservation of the desired freshness textural and eating qualities of the edible binder system is further enhanced by at least intermittently and preferrably continuously mixing or stirring the binder ingredients during the molten binder admixture mass preparation. A variety of heating and mixing techniques or devices (e.g. manual stirring while heating in an open cooking vessel, cooking vessels equipped with both heating and mechanical stirring means such as currently used in the confectionary and candy manufacture, etc.) may be used for this purpose. The combined effect of heating the binder ingredients to a melt temperature while admixing under conditions which elastically stretch and shear the binder ingredients (e.g. such as created by paddle mixer and mixing bowl combinations which compressively shear, scrape and stretch the binder ingredients) are most suitably used to convert the coating and binder recipe ingredients into a molten mass. Such mechanical shearing and stretching tends to produce a molten mass possessing the desired adhesive and tensile properties for more effectively coating and binding the popped corn kernels together.

The particular type of edible fat used in the coating and binder recipe will affect its melt properties. For example, a binder formulated with marshmallow and butter will typically begin to melt at about 30° C. to about 35° C. The desired molten and adhesive tack for blending the butter formulated binder with the popped corn kernels will generally be achieved upon reaching a temperature of about 65° C. A hydrogenated corn oil margarine and marshmallow combination contributes towards a more elevated beginning melting temperature (e.g about 50° C.) with a full melt temperature of about 65° C. or higher providing the most appropriate temperature for mixing the molten binder with the popped corn kernels. A sunflower oil and marshmallow blend evinces a beginning melting point at about 38° C. with a more complete and uniform melt occuring at about 82° C.

Optional binder additives such as coloring and flavoring components in an amount sufficient to impart the desired color and/or flavor to the mass may be incorporated into the molten mass simultaneously with the fat or after its incorporation into the molten mass. As an edible binder component, the fat disrupts the crystallinity pattern of the sugar solids and generally depresses the melting temperature of the binder system. The edible fat also serves as an effective plastizer for the binder system and thus significantly enhances its overall textural and eating attributes. The edible fat also improves upon the product's storage life as well as stabilizing the binder system against subsequent moisture gain or loss. The freeze thaw stability and the microwave cookery attributes, without destroying the efficacy of the binder system of the present preformed popped corn products, is believed to be related to the edible fat component and its functional interrelationship with the other components of the binder system herein.

In preparing the coating and binders of this invention, it is desirable to initially add the edible fat component to the mixing vessel, gradually increase the mix temperature, add the sweetener solids and hydrophillic film former to the edible fat component melt and then gradually increase (while admixing) the mix temperature sufficiently to convert mix ingredients into a molten admixture mass with the edible fat component being uniformly blended throughout the molten mass admixture. At this processing stage, it is desirable to immediately add and coat the popped corn kernels with the coating composition.

The uniform blending together of molten binder mass with the popped corn kernels is advantageously conducted at a coating temperature substantially below those customarily used (e.g. 115°–140° C.) in conventional binder recipes. The popped corn kernels may be appropriately directly added to and mixed within the mixing and heating device which is used to prepare and containing the molten mass. The blending and incorporation of the popped corn kernels into the molten mass uniformly dissipitates the heat and effectively protects that molten binder from thermal degradation. The initially molten admixture mass temperature during which the popped corn kernels are directly incorporated into the molten binder admixture will advantageously be at less than about 90° C. and preferrably less than 85° C. Molten mass temperatures such as from about 65° C. to about 80° C. can be used advantageously to optimize the working range and efficacy of coating the popped corn kernels. These somewhat more elevated molten mass temperature ranges permit a greater latitude and tolerance for forming the binder coated popped corn kernels into the desired shaped popcorn product form.

The shaping of the uniform blend of coated popped kernels is most effectively accomplished during a time interval when the binder coating is in a hot and tacky state. The shaping of the uniform blend is typically conducted while the edible binder is maintained in the molten or melted state. The present binder system, however, inherently possesses unique and beneficial binding abilities so as to permit the shaping to be conducted at temperatures above or below the melting point of the binder mass. The structural integrity of the fragile popped kernels as well as eating and textural characteristics of the shaped popped corn product, however, may be more appropriately effectuated by shaping the product while the binder is maintained in a relatively hot tacky condition (e.g. no less than 50° C.) and preferrably at or slightly above the binder melting point.

The shaping of uniform blend of popped corn kernels externally coated with the edible coating composition may generally be accomplished by applying sufficient compressive pressure upon the blend so as to form it into the desired preformed or shaped popped corn product. The compressive pressure causes the external binder coating about the individual popped corn kernels to meld together and form a shaped popped corn product comprised of a multiplicity of the individually coated kernels firmly anchored and more densely bound together within the binder matrix. Such shaping may be manually accomplished by hand molding or by alternatively mechanically forming devices. Compared to the conventional binder systems, the unique binder system herein inherently imparts significantly improved chew, textural, elastic adhesive, melt and melding properties to the finished product. Substantially lesser compressive forces are required to appropriately shape the products herein as opposed to the more strenuous forces needed to shape conventional recipes. Such reduced compressive force requirements for the shaping of the product helps alleviate the extent which the normally fragile popped corn kernels are fractured or damaged in the end product.

The shaping is advantageously conducted by providing a predetermined blend amount (e.g. a weighted or volume amount) within a confining zone and then by applying sufficient comprehensive force upon the blend to mold it into the desired popped corn product shape. Such compressive forces compress the admixture mass into a more dense mass which firmly anchors and embeds the kernels within the unique edible binder matrix system of this invention.

The individual popped corn kernels externally coated with the binder system herein enables the manufacturer to prepare a much wider variety of uniquely shaped products. Although conventional popcorn ballers or forming devices may be suitably adapted for the shaping of the product, the binder system uniquely enables the preparer to mass produce a wide variety of differently shaped products by simple scoring, stamping or molding the product by means currently used within the bakery dough industry such as by cookie dough cutters. For example, the popped corn kernels externally coated with the hot binder system herein may be conveniently transferred onto a continuous belt conveyor, passed through a compressive roller or roller combination so to compress and form it into a continuous and compressed sheet form coupled the means for shaping the continuous sheet into the desired configuration (e.g. stamping, scoring or molding devices internally fitted onto the rollers or positioned downstream therefrom) from a uniform blend continuously provided to the shaping site. If desired, the exposed cut edges of the product may be coated with the coating composition.

The processing temperature range as well as the other unique attributes include its melt and remelt characteristics of the binder coated kernels afford a manufacturer significantly greater processing perimeters to mass produce the shaped popped corn products of this invention. The ability to remelt or reconvert the binder itself or the binder coat into a hot or molten state, after the binder or coating has cooled to its solidification temperature, also significantly broadens the processing variations and perimeters of its manfacture. The edible binder and popped kernels may be prepared at separate locations, allowed to be ambiently stored until needed and reheated (e.g. microwave or other heating means) for further processing. Alternatively, the popped kernels may be coated with the binder and allowed to cool to a solidification temperature of the binder with the binder coated kernels later being reheated for shaping the product into the desired form. Popped corn kernels coated with conventional binders are customarily discarded after cooling to below the binder solidification temperature. Thus, the binders of this invention possess remelt properties which enables the manufacturer to reheat either the binder or the binder coated kernels and then subject the coated kernels to further processing into the desired preformed products.

The invention herein permits shaping the products into almost any desired form. Unlike conventional recipes which offer relatively limited design restrictions, the products herein may be designed so as to attract consumer preferrences for a host of seasonal, holiday or ceremonial occassions such as by shaping the products in the configuration of pumpkins, shamrocks, hearts, Christmas trees, stars, snowman, turkeys, bunnies, wedding and anniversary commemoratives, birthday cakes, liberty bells, landmarks, personalities, etc. Such creations may, if desired, be simply shaped within a confining zone formed by a continuous band generally outlining the outer periphery of the desired product configuration with the inner portions thereof being open or of a top enclosure type such as afforded by a cookie dough cutter design commonly used by homemakers. The binder coated kernels may also be simply placed within the confinement of such a banded periphery forming device and firmly pressed downwardly against a rigid surface (e.g. table top) so as to mold or shape the product into the desired form. Similarly, three dimensional creations may be manufactured by using an appropriate compressive molding device fitted with die elements to create the desired elevational impressions and indentations upon the molded product. If desired, the shaped product may be partially or completely coated with a decorative design such as by painting a decorative colored or candy coating thereupon or by enrobing of the product entirely with a candy or colored coating. The compositional and physical attributes of the binder system herein renders it considerably more compatible and shelf stable to such external coating materials than the conventional binder systems.

The functional efficacy of the binder systems afforded by this invention thus contributes to substantial reductions in manufacturing costs and wastes while enhancing the storage stability and overall eating qualities of the product. The binder reduces waste by providing a wider tolerance in workability while also affording a binder system which may be more readily adapted to modernized and mechanized processing thereof. The binder also permits the product to be produced at a central location, warehoused or stored for prolonged periods while also providing a high quality, storage stable product which may be frozen and subjected to microwave cooking without destroying its innate and desirable qualities.

The following examples illustrate the invention:

EXAMPLE I

Shaped popped corn products of a conventional popcorn ball configuration were prepared with an edible coating composition and binder comprised of butter and marshmallow recipe formulation. The edible coating composition and the coating of the popped kernels therewith were conducted with a commerical a mixer-cooker unit (model number 2175) manufactured and distributed by Gold Medal Products Co., 2001 Dalton Avenue, Cincinnati, Ohio 45214-2089. The mixer-cooker unit generally comprises a cooking vessel fitted with a pair of 1425 wattage heating elements, an adjustable heat control sensory device (present at 135° C.) automatically preset to disengage or engage the heating elements at a 135° C. mix temperature and a mechanically bottom driven stirrer fitted with an upper and lower paddles oppositely positioned upon an upwardly extending centrally driven axle.

A six (6) gallon batch of popped corn was intially prepared by adding and popping a recipe comprised of eight (8) ounces coconut popping oil, one-half (½) ounce of table salt and twenty-four (24) ounces of unpopped popcorn kernels in a commercial popcorn popper. The actual dry weight of the popped corn kernels was reduced by approximately one-third (approximately 8 ounces) or to total sixteen (16) ounce weight due to evaporative losses from the popping. The popped kernels were transferred from the popper to a holding tray.

The binder was then prepared within the mixer-cooker unit with the paddler mixer being continuously engaged during its preparation. The temperature of binder ingredients was manually controlled by turning off the heating element switch when the appropriate binder temperature was achieved as observed from a factory equipped confectionary thermometer and thermometer mount therefore for immersion into the binder mass.

One pound of Grade AA dairy butter and one-half (½) gram of FDA yellow coloring powder were first added and melted within the mixer-cooker unit. Thirty-one and one-half (31½) ounces of miniature sized marshmallows (manufactured and distributed by Dowmack Inc, Elk Grove Village, Illinois 60007, under the brand name of WONDERFOOD, the ingredient declaration of which lists as ingredients in order of predominance "corn syrup, sugar, water, corn starch, gelatin, artifical flavor, artifical coloring") were then added to the butter melt.

The binder additives were then continually blended and mixed within the mixer-cooker unit. At a temperature of about 30°–32° C., it was observed that the marshmallows began to melt and meld together. Mixing and heating of the mix ingredients were continued while observing that the additives became progressively more fluid and uniformly blended together as evidenced by the uniformity of yellow color throughout the blended mass. At a temperature of about 60° C., the mixer-cooker unit heating element switch was turned off while closely monitoring the mix temperature. When the mix temperature reached 65° C., the molten binder admixture was considered suitable for coating the popped corn kernels and the popped corn kernels were then promptly dumped back into the mixer-cooker unit while continuously blending the transferred popcorn kernels and molten binder within the mixer-cooker unit. After about 3 minutes of continual mixing, the popped kernels were substantially uniformly coated with the molten binder mass whereupon the binder coated kernels were then transferred from the cooker-mixer unit onto a receiving tray.

Popped corn balls were then prepared from the coated kernels using a commercial corn baller (#2091) sold and distributed by Gold Medal Products, 2001 Dalton Avenue, Cinncinnati, Ohio 45214-2089. The corn baller generally comprises a manually operated forming device equipped with a matching pair of pivotally mounted and handled 3-inch diameter hemispheres, each shaped similar to conventional ice cream scooping devices. This balling device mode of mechanical operations is analogous to a large pair of pliers. Prior to the molding, the internal portions of the hemispheres were coated with a commercial release agent itemizing "vegetable oil (contains one or more of the following - corn, soybean, cottonseed or peanut), lecithon, vanilla (natural and artificial), vegetable extractions, propylene glycol" as the ingredient declarants. The release agent was used for the purpose of providing a cleaner release of the shaped popped corn balls from the corn baller hemispheres.

The jaws of the corn baller hemispheres were then placed in their widest open position and completely filled with the coated popped corn kernels. The separate forming hemispheres were then drawn tightly together so as to compressively force the loosely bound binder coated popped kernels into a more dense and compressed popcorn ball shape measuring 3 inches in diameter.

The coating composition, coated kernels and popped corn ball products prepared in accordance with this Example I were labeled as RUN 1 and subjected to further test results as reported in Example 4.

EXAMPLE 2

For comparative purposes, popcorn balls were then prepared with the mixer-cooker unit and corn baller device of Example 1, via a conventional binder recipe under the recipe directions as recommended by a commercial supplier therefor. The popcorn kernels were popped as in Example 1.

The conventional edible binder system was prepared by first adding eleven (11) ounces of water, twenty-two (22) ounces of Gold Medal Carmel Corn Mix (distributed and sold by Gold Medal Products Co, 2001 Dalton Avenue, Cincinnati, Ohio 45214-2089 the ingredient declaration of which identified the ingredients in order of predominance as "sugar, corn syrup solids, lecithin, cream of tartar and vegetable oil") and twenty-eight (28) ounces of granulated sugar while heating and mixing the binder additives. After mixing for one minute, the mixer motor switch was turned "OFF", and then four (4) ounces of coconut oil added thereto, and the binder additives were then quiescently allowed to cook until the vessel thermal warning buzzer sound at 125° C. The mixer-cooker heating element switch was turned "OFF" and the mixing motor switch was re-engaged to the "ON" position whereupon five gallons prepopped corn was then immediately added to the mixer-cooker unit. Mixing of the molten binder and added prepopped corn was then continued for approximately thirty (30) seconds with kettle in upright position. The kettle of the mixer-cooker unit was then repositioned to the mix position and mixed until the popcorn was thoroughly coated with the conventional binder. The carmel coated kernels were then dumped into a receiving pan and shaped into 3 inch diameter popcorn balls as prescribed in Example 1. The products including the popped cornballs of this Example 2 were labeled as RUN 2 and subjected to further testing, the results of which are reported in the Example 4 test results.

EXAMPLE 3

This example was conducted in the same manner as Example 1 in the preparation of two different coating and binder compositions using the same proportionate amounts of the Example 1 recipe ingredients except one-half (½) pound weight (8 ounces) of a hydrogenated corn oil margarine for the RUN 3 coating composition and one-half (½) pound of sunflower oil for the RUN 4, were respectively utilized as an edible fat replacement for the one pound butter coating composition additive in the Example 1.

The margarine formulated edible binder of RUN 3 exhibited a beginning melt temperature of about 50° C. and a full melt or molten temperature suitable for the addition of the popcorn kernels thereto at about 65° C. The sunflower formulated coating composition of RUN 4 evidenced a beginning softening temperature at about 38° C. and a full melt for the additives and coating of popped corn kernels therewith at about 65° C.

Popped corn balls were prepared from the popped corn kernels coated with the RUN 3 and RUN 4 coating compositions pursuant to the cornballing procedure of Example 1. Further characteristics of the RUN 3 and RUN 4 coating compositions and popped corn balls prepared therefrom are reported in Example 4.

EXAMPLE 4

In this example, the comparative tests were conducted upon the RUN 1-4 products for the purposes of ascertaining the storage stability, freeze-thaw, and microwave cooking attributes of the shaped popcorn balls as well as certain of the respective coating composition properties. Each of the products were prepackaged in a 8.5 mil rectangularly-shaped, plastic bag measuring four inches by two inches by eight inches and open at the top for inserting the popcorn balls within the bag. The popcorn balls were then respectively placed and heat sealed within the individual plastic bags.

The resultant packaged products were then subjected to a series of tests. In one test series, the packaged products were stored under ambient conditions and periodically tested as to the efficacy of the respective binder systems and the shaped products. In another test series, the packaged popped corn balls were subjected to microwave cooking and another test series to freezing at minus 20° C. for eight hours followed by subjecting the respective popped corn ball samples to microwave cooking. In still another test series, samples of the molten coating for RUNS 1-4 taken from the mixer-cooker unit (at their most appropriate molten temperatures for addition and coating the popped corn kernels therewith) were allowed to cool to an ambient solidification temperature and remelted within the mixer-cooker unit for use in coating popped corn kernels therewith. In another test series, samples of the binder coated popped corn kernels of Examples 1-4 were allowed to ambiently cool below the binder solidification temperature, reheated to a binder molten state and the remelts were studied as to efficacy in preparing coated kernels and shaped popped corn balls therefrom.

It was observed that the respective edible fat components utilized in preparing the edible binder of RUN 3 and RUN 4 affected both the melt characteristics and the coating composition during the preparation thereof, as well as in the resultant processed coated and binder product thereof. The use of butter in combination with the marshmallow of RUN 1 reduced the beginning melt temperature to within the 30° C.-35° C. range with a binder melt temperature of about 65° C. being considered most appropriate for the addition the popped corn kernels thereto. The RUN 1 binder system, by itself, upon cooling to solidification and reheating within the mixer melted to a taffy consistency at temperatures between 65°-82° C. The remelted RUN 1 binder was considered of a suitable melt consistency for coating and binding edible popped popcorn kernels therewith.

The RUN 4 coating composition upon solidification to an ambient temperature and reheating exhibited a beginning melt softening at about 37°-38° C. with a melt suitable for popcorn kernel additions and coating at about 65° C. and a full melt at about 82°-83° C. Similar to the RUN 1 remelted coating composition, the RUN 4 remelted coating composition was considered suitable for coating and binding popped corn kernels therewith.

The RUN 1 molten admixture, if maintained for a prolonged period of time at a melt temperature of about 85° C. or higher, tended to brown. The margarine formulated edible binder (RUN 3) increased the browning point to a temperature above 88° C. The margarine formulated edible binder product of RUN 3 exhibited a somewhat higher beginning softening temperature of about 38° C. and was considered suitable for the addition of popped corn kernels thereto at about 65° C. with a full melt characteristics being observed at approximately 82° C.

The sunflower oil mixture possessed a more fluffier in melt character than either the RUN 1 or 3 binder melts. It was also more stable at elevated temperatures against browning in the absence of added popcorn kernels within the 38° to 82° C. range or higher. Upon remelting of the solidified binder the RUN 4 exhibited a beginning melting temperature within the 43°-50° C. and a full melt within the 70°-77° C. range. The RUN 4 reheated mass had a slightly more rubbery texture and was more susceptible to browning comparative to the original melt character which exhibited a relatively high stability against browning (no browning at 82° C.) at elevated temperatures.

Popped corn kernels coated with the RUN 1, 3, and 4 coating compositions when allowed to cool to an ambient temperature and subsequently reheated to a molten binder coating temperature (such as by microwave cooking to a tacky and semi-fluid state) were considered useful for shaping into popped corn balls pursuant to the corn balling technique of Example 1.

In contrast, neither the RUN 2 coating composition nor the popped corn kernels coated therewith were deemed suitable for remelting, or as a remelt for coating or preparing shaped popped corn kernels therefrom with the RUN 2 coating compositions or popped corn kernels therewith.

The packaged popcorn balls of RUN 1, 3, and 4, stored under ambient conditions in a retail store for five or more months, substantially retained their original pliable and desirable textural and eating characteristics. In contrast, the binder systems of the packaged RUN 2 popcorn balls become extremely hard and unchewable after less than one month of storing.

The frozen packaged popped corn balls of RUNS 1-4 were also subjected to microwave cooking in a Sharp-Carosel (model no. 4500) with a 650 watt output and a 1.35 kilowatt and 2450 megahertz rating. Under such microwave cooking conditions, the RUNS 1, 3 and 4 popped corn balls (within or out of the plastic bag) began to soften after 25 seconds (center still cold). The RUNS 1, 3 and 4 popcorn balls after 45 seconds microwave cooking were soft throughout but still held together. After one minute of microwave cooking, the binder systems of RUN 1, 3 and 4 were at a full melt and the respective corn balls collapsed. The collapsed molten popcorn balls of RUN 1, 3 and 4 were deemed suitable for restructuring into the form of a popcorn ball via the corn balling technique of Example 1. It was also observed that as the microwave cooking progressed, the RUNS 1, 3 and 4 binders progressively softened inwardly with a concomitant downwardly gravitational movement of the bound kernels therefrom.

In complete contrast, the RUN 2 popcorn balls exhibited no binder melt characteristics throughout the entire microwave cooking process. It was also observed that the RUN 2 popcorn balls became progressively harder and unchewable as the microwave cooking proceeded.

What is claimed is:

1. A method for preparing a shaped popcorn product comprised of a multiplicity of popped corn kernels bound together with a meltable edible binder mass which possesses sufficient binding properties so as to permit the product to substantially retain its textural and structural integrity when frozen and thereafter subjected to microwave cooking, said method comprising:

(a) converting an edible binder admixture comprised of sweetener solids as a major component on a dry weight basis of said binder admixture, at least 1.0 parts by weight hydrophillic film former solids for each 200 parts by weight dry sweetener solids and at least 2.0 parts by weight edible fat component for each 10 parts by weight dry sweetener solids into a molten mass by admixing said sweetener solids, said film former solids and said fat component together at a temperature sufficient to melt and convert said sweetener solids, said film former solids and said fat component into a molten binder admixture mass;

(b) uniformly blending together said molten binder mass with popped corn composition comprised of a multiplicity of popped corn kernels as a major weight component of said composition under blending conditions sufficient to coat substantially all of said popped corn kernels with said molten binder mass and thereby provide a uniform blend thereof, and;

(c) shaping said uniform blend into the form of a shaped popcorn product by applying sufficient compressive pressure onto the uniform blend so as to form said blend into a shaped popcorn product comprised of a multiplicity of popped corn kernels bound together with said meltable edible binder mass.

2. The method according to claim 1 wherein the sweetener solids, hydrophillic film former solids and edible fat component are admixed together in proportionate amounts sufficient to provide a molten mass at a temperature ranging from about 50° C. to about 90° C.

3. The method according to claim 2 wherein marshmallow solids serves a major source of said sweetener solids and said hydrophillic film former and wherein said sweetener solids and said hydrophillic film former solids are added to a fluid edible fat component and the edible binder admixture is converted into molten binder mass under elastically stretching and shearing admixing conditions.

4. The method according to claim 2 wherein the ingredient source of said sweetener solids and said hydrophillic film former consists essentially of marshmallow solids.

5. The method according to claim 2 wherein the molten binder mass comprises at least 2 parts by weight hydrophillic film former for each 100 parts by weight sweetener solids and at least 4 parts by weight edible fat component for each 10 parts by weight sweetener solids.

6. The method according to claim 5 which includes, prior to shaping the uniform blend into the form of a shaped popcorn product, the additional processing steps of cooling the uniform blend to a solidification temperature of the binder mass, subsequently reheating the uniform blend to a temperature sufficient to permit the popped corn kernels to be coated and formed into a shaped popcorn product and thereafter shaping the reheated blend into the form of a shaped popcorn product.

7. The method according to claim 4 wherein the shaped popcorn product is allowed to cool and the cooled popcorn product is thereafter subjected to microwave cooking.

8. The method according to claim 2 wherein the uniform blend is transferred to a means for continuously feeding said uniform blend to a compressive shaping zone and shaping said feed blend into the form of a shaped popcorn product within said shaping zone.

9. A shaped popped corn product bound together with a meltable edible binder mass which is derived from a molten admixture of binder ingredients and possess sufficient binding properties so as to permit the product to substantially retain textural and structural integrity when frozen and thereafter subjected to microwave cooking, said product comprising a multiplicity of popped popcorn kernels and a meltable edible binder mass which binds said multiplicity of said popped popcorn kernels into the form of a shaped popped corn product, with said edible binder mass being further characterized as having a melting temperature ranging from about 40° C.. to about 95° C., containing sweetener solids as a major ingredient, at least one part by weight hydrophillic film former for each 200 parts by weight dry sweetener solids and at least two parts by edible fat component for each 10 parts by weight dry sweetener solids.

10. The shaped product according to claim 9 wherein the edible binder comprises at least 2 parts by weight hydrophillic film former for each 100 parts by weight sweetener solids and at least 4 parts by weight edible fat component for each 10 parts by weight sweetener solids.

11. The shaped product according to claim 9 wherein the sweetener solids, hydrophillic film former and edible fat component are present in the edible binder in proportionate amounts sufficient to provide an edible binder exhibiting a melting temperature ranging from about 50° C. to about 90° C.

12. The shaped product according to claim 11 wherein marshmallow solids serve as a major source ingredient, on a dry weight basis, of said sweetener solids and said hydrophillic film former in said edible binder.

13. The shaped product according to claim 9 wherein the ingredient source of said sweetener solids and said hydrophillic film former in said binder consists essentially of marshmallow solids.

14. The shaped product according to claim 10 wherein the edible binder exhibits a melting temperature within about a 60° C. to about 85° C. temperature range and the binder of said shaped product exhibits melt characteristics when said shaped product is subjected to microwave cooking.

15. A coating popped corn product formulated with a meltable coating composition derived from a molten admixture mass consisting essentially of sweetener solids, hydrophillic film former and edible fat component, said product comprising a multiplicity of popped popcorn kernels and a meltable, edible coating composition coating coated upon the surfaces of said kernels, said coating composition being further characterized as exhibiting a melting temperature ranging from about 40° C. to about 95° C. and containing sweetener solids as a major ingredient of said coating composition, at least one part by weight hydrophillic film former for each 100 parts by dry weight sweetener solids and at least 3 parts by weight edible fat component for each 10 parts by dry weight sweetener solids.

16. The coated product according to claim 15 wherein the edible coating exhibits a melting temperature within about a 60° C. to about 85° C. temperature range and melt properties when said coated product is subjected to microwave cooking.

17. The coated product according to claim 15 wherein the coating composition contains at least 2 parts by weight hydrophillic film former for each 100 parts by weight sweetener solids and at least 4 parts by weight edible fat component for each 10 parts by weight sweetener solids.

18. The coated product according to claim 17 wherein the ingredient source for said sweetener solids and said hydrophillic film former consists essentially of marshmallow solids.

19. The coated product according to claim 18 wherein the hydrophillic film former is at least one member selected from the group consisting of gelatin and egg albumin.

* * * * *